No. 730,295. Patented June 9, 1903.

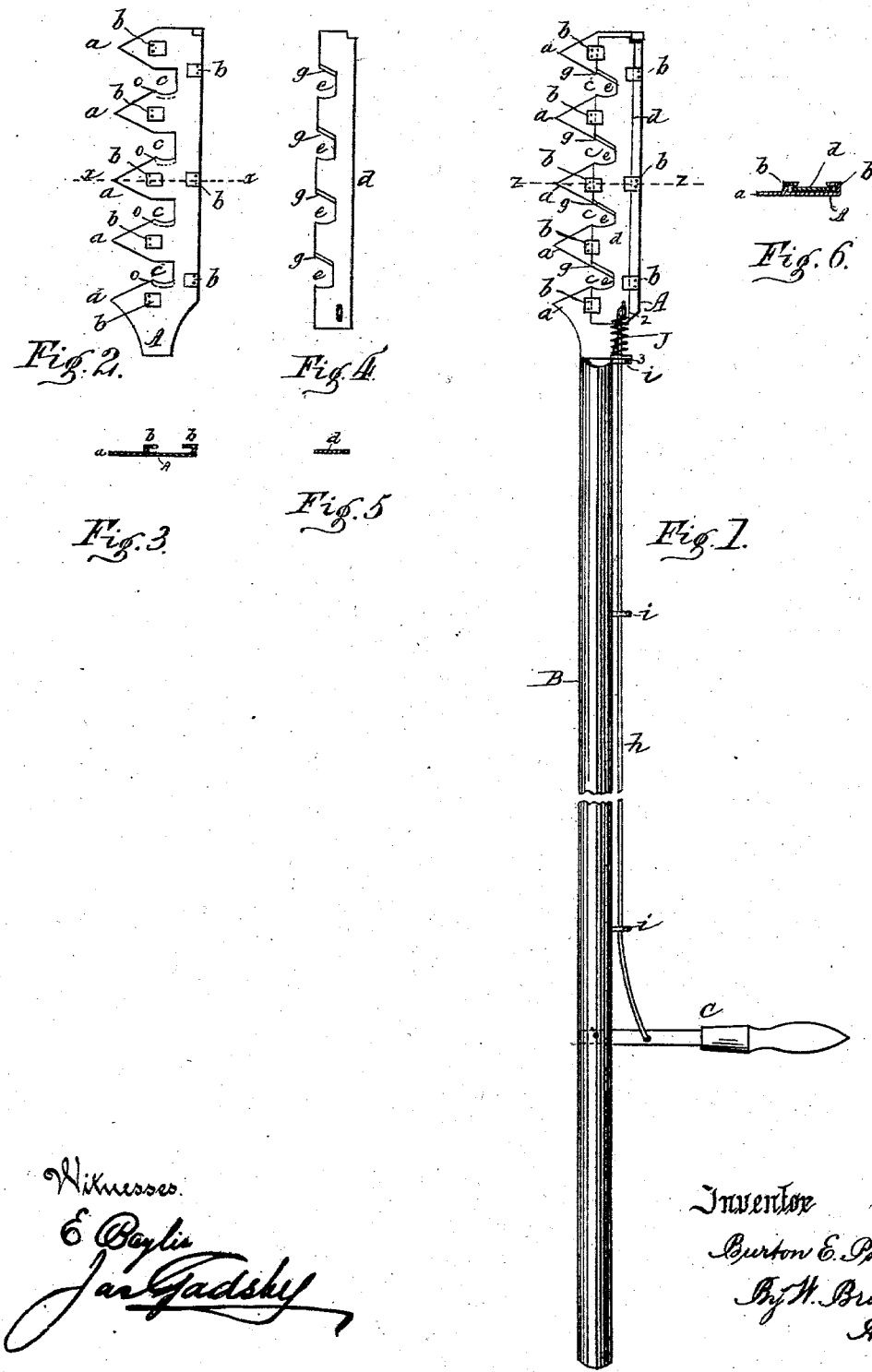

UNITED STATES PATENT OFFICE.

BURTON EDWARD POOLE, OF HAMILTON, CANADA.

PRUNING APPARATUS.

SPECIFICATION forming part of Letters Patent No. 730,295, dated June 9, 1903.

Application filed December 22, 1902. Serial No. 136,303. (No model.)

*To all whom it may concern:*

Be it known that I, BURTON EDWARD POOLE, a citizen of the Dominion of Canada, residing at Hamilton, in the county of Wentworth, in the Province of Ontario, Canada, have invented a certain new and useful Improvement in Pruning Apparatus, of which the following is a specification.

My invention relates to a very simple yet handy and effective device for combing or cutting the ends off the smaller or outer branches of fruit-trees, causing them to be more symmetrical and fruitful. I attain this object by the mechanism illustrated in the accompanying drawings, in which—

Figure 1 is a longitudinal side elevation of a pruning apparatus embodying my invention. Fig. 2 is a plan view of the guide and guard plate detached. Fig. 3 is a cross-section of the same. Fig. 4 is a plan view of the cutter detached, showing four cutting edges. Fig. 5 is a cross-section of the same. Fig. 6 is a cross-section on the line $z\ z$ of Fig. 1.

The device consists first of a metallic plate A, provided with a series of pointed <-shaped guards $a$, which also act as guides to draw in the small outer branches of fruit-trees and hedges to the knife-edges. The guards and guides are also provided with a series of recesses $c$ between the teeth $a\ a\ a\ a$ to serve as receptacles where the branches are cut. The said metallic plate A is also provided with a series of guide projections $b$, some on the rear side and others on the tooth-shaped guides $a$, to allow a cutting-plate $d$ to slide therein on the flat plate A. This cutting-plate has a series of notches $e$ cut out of its front side, the top of each one being chisel-shaped and having a sharp cutting edge. There are four of these cutters, as shown at $g\ g\ g\ g$, and are made to slide against the plate A, being retained thereto by the said grooved projections $b$, and be in a position to cut anything that is in the recesses $c$ of the said main plate A. It will also be seen that to facilitate the cutting operation the inner upper side of the guides $a$ (except the top one) are slightly curved and beveled to a sharp knife-edge on the under side, as shown by the dotted lines $o$, Fig. 2. Thus eight sharp knife-edges come together simultaneously when the cutting-plate $d$ is pulled downward.

A handle B of any desired length will be affixed firmly to the lower end of the guide-plate A, and a strong wire $h$ will be secured to the bottom of the sliding cutter $d$ and be made to pass down along the handle B in guide-eyes $i$, secured thereto, and terminate and be affixed to a hand-lever C, which is pivoted to the handle B toward its lower end. By moving the said hand-lever C downward the cutting-bar $d$, with its four sharp cutters $g\ g\ g\ g$, is also drawn downward and cuts off the ends of the small branches, that are guided to the knife-edges by the <-shaped points $a$ of the guide and guard plate A.

A spring J of the desired form and strength is made to surround the knife-operating wire $h$ between the points 2 3 for the purpose of pushing the cutter-plate $d$ upward and back to its place after each cut. By this means the cutter-plate $d$ is automatically elevated after each cut downward without the operator pushing it up, as the spring rests upon a shoulder attached to the pole-handle B at the point 3 and to the cutter-plate $d$ at the point 2.

It will be seen that the notches $e$ are cut in the knife or cutter-plate $d$ in such a manner that the parts of the knife between the said notches will close the openings $c$ in the guide-plate A as the branch is being cut.

Having thus described my device and its advantages, what I claim as my invention, and desire to secure by Letters Patent, is—

A pruning apparatus consisting of a base-plate provided with a series of <-shaped guards and guides, and a recess between each, and a cutter-plate having a series of corresponding recesses, the upper edge of each being sharp or chisel-shaped, the said cutter made to slide in grooves on the base-plate, a handle affixed to the base-plate, a wire fastened to the sliding cutter and to a hand-lever pivoted to the pole-handle, a spring affixed to the cutter-plate and to a shoulder on the handle to push up the cutter after being drawn downward, all constructed and arranged substantially as and for the purpose specified.

Dated at Hamilton, Ontario, Canada, the 12th day of December, 1902.

BURTON EDWARD POOLE.

In presence of—
GEO. E. BOND,
WM. BRUCE.